Patented Apr. 5, 1938

2,113,093

UNITED STATES PATENT OFFICE 2,113,093

MANUFACTURE OF ORGANIC DISULPHIDES

Robert C. Moran, Wenonah, and George S. Crandall, Woodbury, N. J., assignors to Socony-Vacuum Oil Company, Incorporated, New York, N. Y., a corporation of New York No Drawing. Application December 3, 1936, Serial No. 114,088

6 Claims. (Cl. 260—16)

In our copending application, Serial No. 41,554, filed September 21, 1935, we have disclosed a novel method for the manufacture of dibenzyl disulphide. We have now discovered that this method of preparation is applicable generally to the manufacture of many disulphides and this disclosure is directed thereto. For exemplary purposes, a portion of the following discussion is directed to the manufacture of dibenzyl disulphide.

Present methods of preparation of these compounds are expensive and time-consuming, being mostly laboratory type operations carried out upon a somewhat enlarged scale, and the resulting product is so high in cost that it is prevented from entering into wide use, even though usually used in quite small proportions.

Various methods of preparation of dibenzyl disulphide may be found in the literature, the usual ones and references pertinent thereto being as follows:

(a) From benzyl chloride

| | | |
|---|---|---|
| Blanksma Rev. trav. chim. | 20 | 137 |
| Märcker Ann. | 136 | 87 |

(b) From benzal chloride

| | | |
|---|---|---|
| Cahours Ann. | 70 | 40 |
| Fleischer Ann. | 140 | 234 |
| Schmoldt Ber. | 40 | 2870 |

(c) From benzyl mercaptan

| | | |
|---|---|---|
| Märcker Ann. | 136 | 86 |
| Märcker Ann. | 140 | 86 |
| Smythe & Forster-J. Chem. Soc. | 97 | 1195 |

(d) From sodium benzyl thiosulphate

| | | |
|---|---|---|
| Price-Twiss J. Chem. Soc. | 91 | 2026 |
| Price-Twiss J. Chem. Soc. | 93 | 1399 |
| Price-Twiss J. Chem. Soc. | 95 | 1490 |

Of the methods above set forth, the one most feasible and most usually used is the reaction of benzyl chloride with sodium sulphide plus sulphur, carried out in a homogeneous reaction mixture in alcoholic solution, as studied by Blanksma and Märcker. (See "a" above.) In this method of preparation the reaction ingredients are brought together in alcoholic solution, and reaction is carried out at elevated temperatures for several hours, with stirring, under a reflux column. After reaction, the reaction mixture is cooled and the dibenzyl disulphide product is obtained by repeated crystallization. A very extensive washing of the several crops of crystals, first with increasingly dilute alcoholic solutions and finally with water is required in order to secure a product of the purity required for even technical uses. After this, the entire bulk of the alcoholic solutions, must be redistilled to recover the alcohol and residual reagents for reuse in the process. The preparation after this method is highly time-consuming, wasteful of reagents, prone to high solvent losses, and incapable of conveniently yielding a product of even a high degree of technical purity.

An object of this invention is to provide a method whereby certain organic disulphides may be manufactured in commercial quantities of a high degree of purity without excessive loss of solvents and reagents and without complicated processing in equipment of ordinary type, such as iron equipment. Other objects are in part obvious, and in part may be hereinafter disclosed.

We have found that these objects may be attained by the condensation of aromatic acid halides, or aliphatic acid halides, or alkyl halides with sodium sulphide plus sulphur in a system comprising non-homogeneous solutions in a manner hereinafter described.

The non-homogeneous system we make use of for the preparation of dibenzyl disulphide consists of two immiscible phases, one of which is benzyl chloride, with or without a solvent liquid capable of dissolving dibenzyl disulphide, and the other of which is an aqueous solution of sodium sulphide plus sulphur.

For the solvent phase, any solvent may be used which exhibits the characteristic of solvent power for dibenzyl disulphide, in combination with other properties as follows:

1. Solvent power for dibenzyl disulphide preferably greater when hot than when cold.
2. Inertness to the reagents employed.
3. Practically immiscible with water.

As examples of the solvents which may be used successfully we may name benzol, toluol, xylol, normal amyl alcohol, n-butyl alcohol, n-hexyl alcohol, cyclohexyl alcohol, n-butyl ether, and petroleum fractions of the nature of Stoddard solvent, which is a naphtha boiling between the ranges of 300° F. and 400° F. In the following example of procedure, the use of benzol is described.

The improved process consists of agitating, at about 50° C. to 80° C., or preferably such a temperature as will bring about boiling of the benzol in the mixture, a non-homogeneous reaction mixture comprising a solution of benzyl chloride in benzol and one of sodium sulphide plus free sulphur in water. The vessel in which this is carried out is equipped with a reflux column, so that vapors of benzol may be condensed and returned to the system. After reaction for about one hour, agitation is stopped, and the charge settles and separates readily. The aqueous layer is drawn off, and the benzol layer is removed and filtered hot, to separate from it contaminants which are insoluble in the hot solution, after which it is cooled to a temperature near atmospheric and filtered to remove the separated crystalline product. After drying, the crystalline dibenzyl disulphide thus recovered will be found to have a melting point of 67 to 69° C. and to be sufficiently pure for technical use. The filtrate recovered is returned to the next batch as solvent for the benzyl chloride, whatever fresh benzol makeup being necessary representing the unavoidable losses in the carrying out of the process. Operating in this fashion the yield of dibenzyl disulphide is 90% of the theoretical or better.

The following is an illustration of the improved process:

Into the reaction vessel, provided with a reflux condenser and suitable agitation, are charged the following materials, given in parts by weight:

| | Parts |
|---|---|
| Benzyl chloride | 5.2 |
| Benzol | 4.9 |
| Sodium sulphide | 7.6 |
| Sulphur | 1.0 |
| Water | 12.9 |

The sodium sulphide, sulphur and water are added first, and solution obtained by agitation with warming. The benzol solution of benzyl chloride is then added gradually with agitation. The reaction mixture is heated to about 80° C. when refluxing starts. After maintaining this temperature and active agitation for about one hour, the charge is allowed to separate, the lower aqueous layer drawn off and the upper layer run off to a suitable vessel for precipitation of the dibenzyl disulphide on cooling. After filtration, the dibenzyl disulphide is thoroughly dried at about 50° C. and is then satisfactory for technical use. The filtrate is used in the next charge, with whatever addition of fresh benzol is necessary in accord with the above weight proportions, as reaction medium.

The yield of dibenzyl disulphide thus obtained by single crystallization in cooling the benzol layer to room temperature, where fresh benzol entirely is used in the reaction mixture, is about 2.5 parts by weight or about 50% of the theoretical. By repeated recrystallization about 2.3 parts more can be obtained. We prefer, however, to operate differently and avoid these repeated recrystallizations by returning the filtrate from the first crystallization to the next reaction mixture charge as solvent for the benzyl chloride. Operating in this manner, the yield of dibenzyl disulphide from a single crystallization amounts to 4.8 parts by weight or better (90% or better of theory).

The following is a summary of materials requirements in parts per part of dibenzyl disulphide (95.2% yield) in comparison with those of the prior art using alcohol as reaction medium (81.5% yield).

From this tabulation it appears that a given reaction vessel will have about three times the production capacity by the improved process as compared with prior art using alcohol as reaction medium.

| | Improved process | | Prior art | |
|---|---|---|---|---|
| | By weight | By volume | By weight | By volume |
| Reaction mixture: | Lbs. | Gals. | Lbs. | Gals. |
| Benzyl chloride | 1.09 | 0.12 | 1.27 | 0.13 |
| Alcohol, ethyl, as 95% | None | None | 10.68 | 1.63 |
| Benzol | 1.03 | 0.14 | None | None |
| Sodium sulphide | 1.60 | | 1.91 | |
| Sulphur | 0.21 | | 0.24 | |
| Water | 2.71 | 0.31 | | |
| Total parts per part dibenzyl disulphide | 6.64 | 0.57 | 14.10 | 1.76 |
| Purification: | | | | |
| Alcohol, ethyl, as 95% | None required | None required | 4.72 | 0.72 |
| Water | | | 10.78 | 1.30 |
| Total parts per part dibenzyl disulphide | | | 15.50 | 2.02 |
| Grand total per part dibenzyl disulphide | 6.64 | 0.57 | 29.60 | 3.78 |

As compared with prior practice, using 95% alcohol as the reaction medium, the improved process disclosed herein has the following advantages:

(a) Production capacity of a given reaction vessel is increased three-fold or more.

(b) Saving in time due to the fact that sodium sulphide dissolves readily in water but not alcohol.

(c) Further saving in time, materials and equipment since the crude product from the improved process requires no further purification.

(d) Decided saving in solvent and equipment cost since the benzol reaction medium is used over and over again without redistillation. This is not possible with the alcohol process. Therefore, the solvent cost will be that of the make-up representing unavoidable benzol losses in the operation of the process.

With respect to large-scale production, the improved process can be carried out in ordinary iron apparatus, and no distillation equipment is required for the recovery of solvent medium; the solvent from the preceding run, after a single crystallization of dibenzyl disulphide therefrom, being used as reaction medium. In other words, the solvent medium in each run after the first is benzol saturated at about room temperature with dibenzyl disulphide. As compared with prior art, the improved process about triples the capacity of a given apparatus and at the same time reduces the reaction materials cost per pound of dibenzyl disulphide about 50%.

With respect to the use of solvents other than benzol, the following may be noted: The same procedure is used with these solvents as with benzol. The reaction temperature is the boiling point of the heterogeneous mixture. The proportion of solvent used may be varied over a wide range. The lower limit is dependent on the ability to handle the highly concentrated hot solutions of dibenzyl disulphide, and the upper limit is dependent on convenience of handling large quantities of solvent. By continuous operation the solvent becomes saturated with the dibenzyl disulphide at the crystallization temperature and is reused successfully. In practice 1.2 to 1.7 volumes of solvent were mixed with 1 volume of benzyl chloride.

The reaction may also be carried out in the absence of an organic solvent at approximately the boiling temperature of the mixture; the dibenzyl disulphide being subsequently extracted from the reaction mixture with a water immiscible organic solvent, such as one of those mentioned above or a halogenated organic compound such as carbon tetrachloride, chloroform, ethylene dichloride or any chlorinated organic compound of low mutual water solubility and good solvent power toward dibenzyl disulphide.

The following variations of the method are exemplary of those that have been found to be effective as a method of commercial preparation:

| Solvents | Yield | Ratio vol. solvent / Vol. benzyl chloride |
|---|---|---|
| Hydrocarbons— | Percent | |
| Benzene | 95.2 | 1:1 |
| Xylene | 81.4 | 1:1 |
| Naphtha (Stoddard solvent) | 93.5 | 1:1 |
| Alcohols— | | |
| n-Amyl alcohol | 83.5 | 1:1 |
| No solvent | 91.9 | |

This method of preparation is also applicable to aromatic acid halides of the type RCOHal, such as benzoyl chloride and toluyl chloride, to aliphatic acid halides of the type RCOHal, such as butyryl chloride and acetyl chloride, and to alkyl halides of the type RHal, such as amyl chloride and butyl chloride. It is not applicable to synthesis with the aryl chlorides and phenyl chlorides.

In the preparation of diamyl disulphide, the reaction system, as above outlined, may contain about 20% excess of sodium disulphide and the reaction thereof with normal amyl chloride may be carried out at about 212° F., preferably upon a water bath, with appropriate subsequent purification steps to yield 40% of the theoretical yield of diamyl disulphide. Benzol is a convenient solvent.

Dibenzoyl disulphide may be prepared, using benzoyl chloride, and about 20% excess of sodium disulphide. The benzoyl chloride is added slowly to the ice-cooled solution of sodium disulphide in the presence of benzol, and the mixture is then allowed to come to room temperature. The yield in this case is 62–64% of the theoretical.

Dibutyryl disulphide may be similarly prepared by adding butyryl chloride to an ice-cooled sodium disulphide solution in the presence of benzol, the yield being about 42% of the theoretical.

We claim:
1. A process for the manufacture of organic disulphides which comprises the following steps: Reacting a non-homogeneous system comprising a water solution of sodium sulphide containing excess sulphur and a material selected from the group consisting of aliphatic and aromatic acid halides and aliphatic halides with agitation, sufficient water being present in such solution to permit of phase separation in the reaction mixture, allowing phase separation, and recovering the disulphide from the non-aqueous phase.

2. A process for the manufacture of organic disulphides which comprises the following steps: Reacting a non-homogeneous system composed of a water solution of sodium sulphide containing excess sulphur and a material selected from the group consisting of aliphatic and aromatic acid halides and aliphatic halides with agitation, sufficient water being present in such solution to permit of phase separation in the reaction mixture, allowing phase separation, and recovering the disulphide from the non-aqueous phase by extraction from the reaction mixture with a solvent non-miscible with water, followed by recovery of the disulphide from the solvent.

3. A process for the manufacture of organic disulphides which comprises the following steps: Reacting a non-homogeneous system composed of a water solution of sodium sulphide containing excess sulphur and a material selected from the group consisting of aliphatic and aromatic acid halides and aliphatic halides in the presence of a water-immiscible solvent capable of dissolving the disulphide to be produced, sufficient water being present in such solution to permit of phase separation in the reaction mixture, agitating the mixture until completion of the reaction, allowing phase separation, parting the phases, and recovering the disulphide product from the solvent phase.

4. A process for the manufacture of organic disulphides which comprises the following steps: Reacting a non-homogeneous system composed of a water solution of sodium sulphide containing excess sulphur and a material selected from the group consisting of aliphatic and aromatic acid halides and aliphatic halides with agitation, sufficient water being present in such solution to permit of phase separation in the reaction mixture, allowing phase separation, and recovering the disulphide from the non-aqueous phase by extraction from the reaction mixture with a solvent selected from the group consisting of benzol, xylol, toluol, n-butyl alcohol, n-hexyl alcohol, cyclohexyl alcohol, n-butyl ether, normal amyl alcohol, and petroleum naphthas, followed by recovery of the disulphide from the solvent.

5. A process for the manufacture of organic disulphides which comprises the following steps: Reacting a non-homogeneous system composed of a water solution of sodium sulphide containing excess sulphur and a material selected from the group consisting of aliphatic and aromatic acid halides and aliphatic halides in the presence of a solvent selected from the group consisting of benzol, xylol, toluol, n-butyl alcohol, n-hexyl alcohol, cyclohexyl alcohol, n-butyl ether, normal amyl alcohol, and petroleum naphthas, sufficient water being present in such solution to permit of phase separation in the reaction mixture, agitating the mixture until completion of the reaction, allowing phase separation, parting the phases, and recovering the disulphide product from the solvent phase.

6. A process for the manufacture of organic disulphides which comprises the following steps: Reacting a non-homogeneous system composed of a water solution of sodium sulphide containing excess sulphur and a material selected from the group consisting of aliphatic and aromatic acid halides and aliphatic halides with agitation, sufficient water being present in such solution to permit of phase separation in the reaction mixture, allowing phase separation, and recovering the disulphide from the non-aqueous phase by extraction from the reaction mixture with a chlorinated organic solvent non-miscible with water, followed by recovery of the disulphide from the solvent.

ROBERT C. MORAN.
GEORGE S. CRANDALL.